(12) United States Patent
Nakahira et al.

(10) Patent No.: US 11,818,670 B2
(45) Date of Patent: Nov. 14, 2023

(54) WIRELESS COMMUNICATION SYSTEM, WIRELESS COMMUNICATION METHOD, AND WIRELESS STATION DEVICE

(71) Applicant: Nippon Telegraph and Telephone Corporation, Tokyo (JP)

(72) Inventors: Toshiro Nakahira, Musashino (JP); Hirantha Abeysekera, Musashino (JP); Tomoki Murakami, Musashino (JP); Koichi Ishihara, Musashino (JP); Takafumi Hayashi, Musashino (JP); Yasushi Takatori, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 208 days.

(21) Appl. No.: 17/610,752

(22) PCT Filed: Jun. 10, 2019

(86) PCT No.: PCT/JP2019/022982
§ 371 (c)(1),
(2) Date: Nov. 12, 2021

(87) PCT Pub. No.: WO2020/250285
PCT Pub. Date: Dec. 17, 2020

(65) Prior Publication Data
US 2022/0232485 A1 Jul. 21, 2022

(51) Int. Cl.
*H04W 52/28* (2009.01)
*H04W 16/14* (2009.01)

(52) U.S. Cl.
CPC ......... *H04W 52/281* (2013.01); *H04W 16/14* (2013.01)

(58) Field of Classification Search
None
See application file for complete search history.

(56) References Cited

U.S. PATENT DOCUMENTS

| | | | |
|---|---|---|---|
| 11,617,070 B2* | 3/2023 | Taniguchi | H04M 11/00 455/419 |
| 2006/0099954 A1* | 5/2006 | Henderson | H04W 16/00 455/447 |

(Continued)

FOREIGN PATENT DOCUMENTS

WO WO 2014/073706 5/2014

OTHER PUBLICATIONS

Morikura et al., "802.11 High Speed Wireless LAN Textbook Revised 3rd Edition," Impress R & D, Mar. 27, 2008, pp. 6-9, 5 pages (with English Translation).

(Continued)

*Primary Examiner* — Pablo N Tran
(74) *Attorney, Agent, or Firm* — Fish & Richardson P.C.

(57) ABSTRACT

A wireless communication system in which wireless stations perform transmission, a plurality of wireless modules that are operated in a shared frequency band being installed in the wireless stations, wherein the wireless stations each include means for notifying a control device of environment information that includes capacity information regarding the wireless station and information regarding a surrounding wireless environment, and setting transmission power values in the plurality of wireless modules, the wireless stations being notified of the transmission power values by the control device, and the control device includes means for calculating a transmission power value of each wireless module of each wireless station based on the environment information collected from each wireless station, following a control guideline that is determined in advance, and notifying the wireless stations of the transmission power values.

12 Claims, 6 Drawing Sheets

(56) References Cited

U.S. PATENT DOCUMENTS

| | | | |
|---|---|---|---|
| 2008/0026764 A1* | 1/2008 | Shimura | H04W 8/245 455/446 |
| 2009/0046686 A1* | 2/2009 | Izaki | H04W 8/20 455/420 |
| 2014/0256335 A1* | 9/2014 | Kobayashi | H04B 17/382 455/450 |
| 2015/0289142 A1 | 10/2015 | Abeysekera et al. | |

OTHER PUBLICATIONS

Nakahira et al., "802.11ax based Multi-RF control method for WiSMA," Proceedings of the 2018 IEICE General Conference, Mar. 20, 2018, p. 426, 3 pages (with English Translation).

* cited by examiner

WIRELESS COMMUNICATION SYSTEM, WIRELESS COMMUNICATION METHOD, AND WIRELESS STATION DEVICE

CROSS-REFERENCE TO RELATED APPLICATIONS

This application is a National Stage application under 35 U.S.C. § 371 of International Application No. PCT/JP2019/022982, having an International Filing Date of Jun. 10, 2019. The disclosure of the prior application is considered part of the disclosure of this application, and is incorporated in its entirety into this application.

TECHNICAL FIELD

The present invention relates to a wireless communication system, a wireless communication method, and a wireless station device that improve reduction in throughput that is caused by CSMA/CA (Carrier Sense Multiple Access with Collision Avoidance) control of each wireless station in an environment that is crowded with wireless LANs (Local Area Networks).

BACKGROUND ART

In recent years, wireless LANs of IEEE 802.11 standards are widely used not only in companies and public spaces but also in ordinary homes due to the spread of wireless terminals such as notebook personal computers and smartphones that are portable and have high performance. Wireless LANs of the IEEE 802.11 standards include wireless LANs of IEEE 802.11b/g/n standards, which use the 2.4 GHz band, and wireless LANs of IEEE 802.11a/n/ac standards, which use the 5 GHz band.

In wireless LANs of IEEE 802.11b standards and IEEE 802.11g standards, 13 channels are prepared between 2400 MHz and 2483.5 MHz at intervals of 5 MHz. However, when a plurality of channels are used at the same place, the maximum number of channels that can be simultaneously used is three or may be four, if the channels are used such that spectrums do not overlap to avoid interference.

In wireless LANs of IEEE 802.11a standards, a total of 19 channels are defined in the case of Japan, the 19 channels being constituted by 8 channels and 11 channels that do not overlap each other and are respectively defined between 5170 MHz and 5330 MHz and between 5490 MHz and 5710 MHz. Note that the bandwidth per channel is fixed to 20 MHz in the IEEE 802.11a standards.

The maximum transmission speed of a wireless LAN is 11 Mbps in the case of the IEEE 802.11b standards and is 54 Mbps in the case of the IEEE 802.11a standards and the IEEE 802.11g standards. However, the transmission speed referred to here is the transmission speed in a physical layer. Actually, a transmission efficiency in a MAC (Medium Access Control) layer is about 50 to 70%, and therefore an upper limit value of actual throughput is about 5 Mbps in the case of the IEEE 802.11b standards and is about 30 Mbps in the case of the IEEE 802.11a standards and the IEEE 802.11g standards. Also, the transmission speed is further reduced if wireless stations that transmit information increase.

On the other hand, with the spread of FTTH (Fiber To The Home) using optical fibers at homes, such as the 100 Base-T interface of Ethernet (registered trademark), high-speed lines that enable transmission as fast as 100 Mbps to 1 Gbps are widely provided in wired LANs, and there are demands for a further increase in the transmission speed in wireless LANs.

Therefore, in IEEE 802.11n standards completed in 2009, the channel bandwidth that had been fixed to 20 MHz was enlarged up to 40 MHz, and introduction of a spatial multiplexing transmission technology (MIMO: Multiple Input Multiple Output) was determined. If transmission and reception are performed by applying all functions defined in the IEEE 802.11n standards, a communication speed of up to 600 Mbps can be realized in a physical layer.

Furthermore, in IEEE 802.11ac standards completed in 2013, it was determined to enlarge the channel bandwidth to 80 MHz or up to 160 MHz (or 80+80 MHz) and introduce a multi-user MIMO (MU-MIMO) transmission method to which space division multiple access (SDMA) is applied. If transmission and reception are performed by applying all functions defined in the IEEE 802.11ac standards, a communication speed of up to about 6.9 Gbps can be realized in a physical layer.

Also, in IEEE 802.11ax standards that are currently being established, OFDMA (Orthogonal Frequency Division Multiple Access) that enables transmission and reception of frames by dividing the above-described channels of 20 MHz, 40 MHz, 80 MHz, 160 MHz, and 80+80 MHz into smaller sub channels will be defined. If OFDMA is used, transmission can be simultaneously performed by a plurality of wireless stations in each resource unit by dividing the above-described channels into smaller sub channels. Furthermore, in the IEEE 802.11ax standards, a function that increases communication opportunities while suppressing interference from another cell in a surrounding region through carrier sense threshold (CCA threshold) control will be defined.

Wireless LANs of the IEEE 802.11 standards operate in the 2.4 GHz frequency band or the 5 GHz frequency band, for which a license is unnecessary, and accordingly, each wireless base station of the IEEE 802.11 standards selects and uses a frequency channel from frequency channels that can be supported by the wireless base station, when forming a wireless LAN cell (BSS: Basic Service Set).

The cell is operated by writing the channel used in the cell, set values of the bandwidth and parameters other than the bandwidth, and other parameters that can be supported by the wireless base station, in a Beacon frame that is periodically transmitted or a Probe response frame that is transmitted in response to a Probe Request frame received from a wireless terminal, for example, and transmitting the frame in the frequency channel that is determined to be used, to notify wireless terminals under the coverage of the wireless base station and other wireless stations in a surrounding region.

There are the following four methods for selecting and setting the frequency channel, the bandwidth, and other parameters in a wireless base station.

(1) Method of using default parameter values as is, which are set by the manufacturer of the wireless base station.
(2) Method of using values that are manually set by a user who operates the wireless base station.
(3) Method of autonomously selecting and setting parameter values based on wireless environment information that is detected by each wireless base station when starting operation.
(4) Method of setting parameter values that are determined by a central control station such as a wireless LAN controller.

Also, the number of channels that can be simultaneously used at the same place is dependent on the bandwidth of channels that are used for communication, and is 3 in the case of wireless LANs in the 2.4 GHz band, and is 2, 4, 9, or 19 in the case of wireless LANs in the 5 GHz band, and accordingly, when a wireless LAN is actually introduced, a wireless base station needs to select a channel that is to be used in the BSS of the wireless base station (NPL 1).

If the channel bandwidth is enlarged to 40 MHz, 80 MHz, 160 MHz, or 80+80 MHz, the number of channels that can be simultaneously used at the same place in the 5 GHz band, which is 19 if the channel bandwidth is 20 MHz, is reduced to 9, 4, or 2. That is, the number of channels that can be used is reduced as the channel bandwidth is increased.

In an environment that is crowded with wireless LANs and in which the number of BSSs is greater than the number of channels that can be used, a plurality of BSSs use the same channel (OBSS: Overlapping BSS). Therefore, autonomous and distributed access control is used in wireless LANs to transmit data through carrier sensing only when a channel is vacant, by using CSMA/CA (Carrier Sense Multiple Access with Collision Avoidance).

Specifically, a wireless station for which a transmission request occurred initially performs carrier sensing only for a predetermined sensing period (DIFS: Distributed Inter-Frame Space) to monitor the state of a wireless medium, and performs random back-off if there is no transmission signal from another wireless station during the period. The wireless station continuously performs carrier sensing during the random back-off period as well, and obtains a right to use a channel if there is no transmission signal from another wireless station in this period as well. Note that transmission and reception performed by another wireless station is determined based on whether or not a signal that is greater than a preset carrier sense threshold is received. The wireless station that obtained the right to use can transmit data to other wireless stations in the same BSS and receive data from these wireless stations. If such CSMA/CA control is performed, throughput is reduced in an environment crowded with wireless LANs that use the same channel, because the frequency of the channel becoming busy is increased due to carrier sensing. Therefore, it is important to monitor a surrounding environment, select an appropriate channel, and select a transmission power value and a carrier sense threshold that enable simultaneous transmission and reception.

CITATION LIST

Non Patent Literature

[NPL 1] Supervised by Masahiro Morikura and Shuji Kubota, "802.11 HIGH-SPEED WIRELESS LAN TEXTBOOK", $3^{rd}$ revised edition, Impress R&D, March 2008

SUMMARY OF THE INVENTION

Technical Problem

Methods for selecting the parameters described above, such as 2.4 GHz or 5 GHz, which is an operation frequency band of wireless base stations, and channels that are used in the operation frequency band are not defined in the IEEE 802.11 standards, and therefore each vendor adopts unique methods.

Also, wireless stations select the parameters described above in an autonomous and distributed manner, and therefore the parameters cannot be optimized in the entire system, and there is a problem in that user quality is significantly degraded particularly in an environment where the number of wireless stations is large.

Furthermore, wireless stations in which a plurality of wireless modules are installed are increasing in recent years. The aim is to enlarge a band that is used and increase user throughput in a service area by installing a plurality of wireless modules in the same housing and separately using frequency bands and channels.

However, if frequency bands, channels, and transmission power that are respectively used by the installed wireless modules are not appropriately set, the wireless modules interfere not only with another wireless station in a surrounding region but also with each other, and an expected service cannot be provided.

An object of the present invention is to provide a wireless communication system, a wireless communication method, and a wireless station device that can appropriately set transmission power values of a plurality of wireless modules that are installed in wireless stations, to improve an area cover ratio and throughput of the entire system and provide a high-quality wireless environment to each user.

Means for Solving the Problem

A first invention is a wireless communication system in which wireless stations perform transmission, a plurality of wireless modules that are operated in a shared frequency band being installed in the wireless stations, wherein the wireless stations each include means for notifying a control device of environment information that includes capacity information regarding the wireless station and information regarding a surrounding wireless environment, and setting transmission power values in the plurality of wireless modules, the wireless stations being notified of the transmission power values by the control device, and the control device includes means for calculating a transmission power value of each wireless module of each wireless station based on the environment information collected from each wireless station, following a control guideline that is determined in advance, and notifying the wireless stations of the transmission power values.

A second invention is a wireless communication method in which wireless stations perform transmission, a plurality of wireless modules that are operated in a shared frequency band being installed in the wireless stations, wherein the wireless stations each notify a control device of environment information that includes capacity information regarding the wireless station and information regarding a surrounding wireless environment, and set transmission power values in the plurality of wireless modules, the wireless stations being notified of the transmission power values by the control device, and the control device calculates a transmission power value of each wireless module of each wireless station based on the environment information collected from each wireless station, following a control guideline that is determined in advance, and notifies the wireless stations of the transmission power values.

A third invention is a wireless station device in which a plurality of wireless modules that are operated in a shared frequency band are installed, the wireless station device including: means for notifying a control device of environment information that includes capacity information regarding the wireless station and information regarding a surrounding wireless environment; and means for inputting and setting transmission power values of the plurality of wireless modules that are calculated by the control device based on the environment information collected from each wireless station device, following a control guideline that is determined in advance.

Effects of the Invention

According to the present invention, transmission power values of a plurality of wireless modules installed in wireless stations can be appropriately set, and therefore it is possible to improve the area cover ratio and throughput of the entire system and provide a high-quality wireless environment to each user.

DESCRIPTION OF EMBODIMENTS

Figure 1:
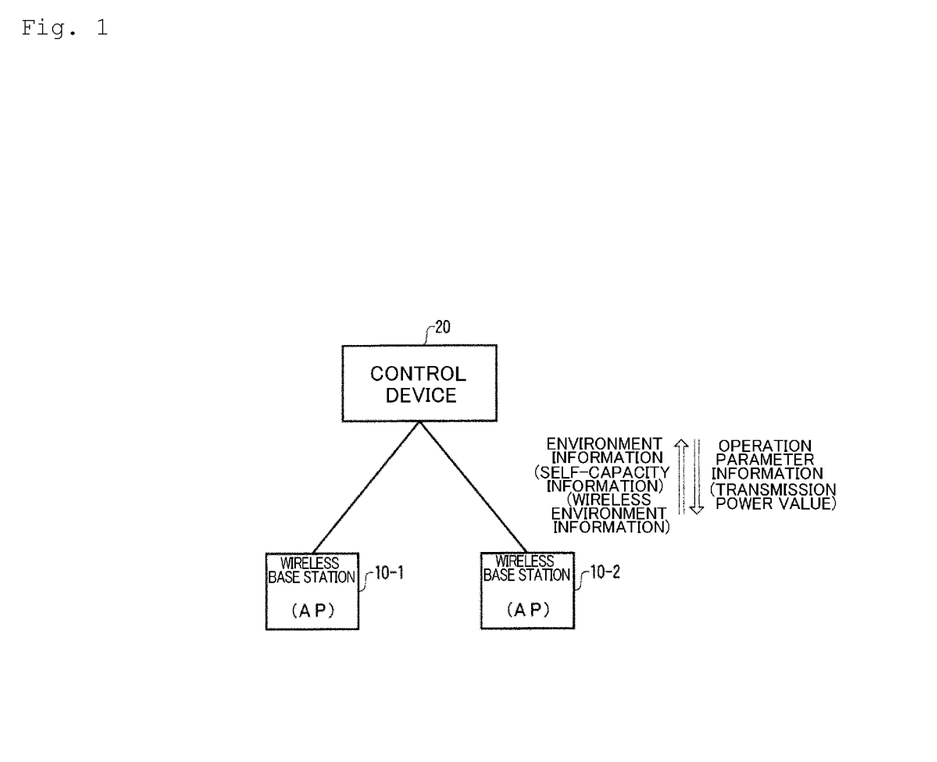
FIG. 1 is a diagram showing an example configuration of a wireless communication system according to the present invention.

FIG. 1 shows an example configuration of a wireless communication system according to the present invention. Here, transmission power control of wireless base stations (AP) that are wireless stations in which a plurality of wireless modules (RFs) operated in a shared frequency band are installed will be described as an example.

In FIG. 1, the wireless communication system has a configuration in which a plurality of wireless base stations (APs) 10-1 and 10-2 are connected to a control device 20. Each of the APs 10-1 and 10-2 includes one or more wireless modules (RFs) and communicates with wireless terminals (not shown) that are under the coverage of the AP. The APs 10-1 and 10-2 each notify the control device 20 of environment information and operate the RFs based on operation parameter information that is given from the control device 20.

The environment information referred to herein is capacity information regarding each RF installed in each AP and information regarding a surrounding wireless environment. Capacity information regarding an RF is, for example, supported wireless LAN standards 11a, 11b, 11g, 11n 20 MHz, 11n 40 MHz, 11ac, or 11ax. Examples of information regarding a surrounding wireless environment include RSSI values of connected terminals, the number of connected terminals, (upstream/downstream) data volumes of connected terminals, MCS of connected terminals, and interference conditions in a surrounding region. Each AP collects these pieces of environment information and notifies the control device 20 of the environment information. The control device 20 associates these pieces of environment information with the degree of priority of each RF of each AP, determines operation parameter information that corresponds to the degree of priority of each RF, and notifies each AP of the operation parameter information.

Here, the degree of priority of each RF is determined according to capacity information regarding the RF or content of a service that is provided by the RF (e.g., the number of connected terminals, traffic volume, traffic QoS, application, etc.). For example, the degree of priority that is based on capacity information regarding each RF becomes higher in the direction from 11a toward 11ax.

Figure 2:
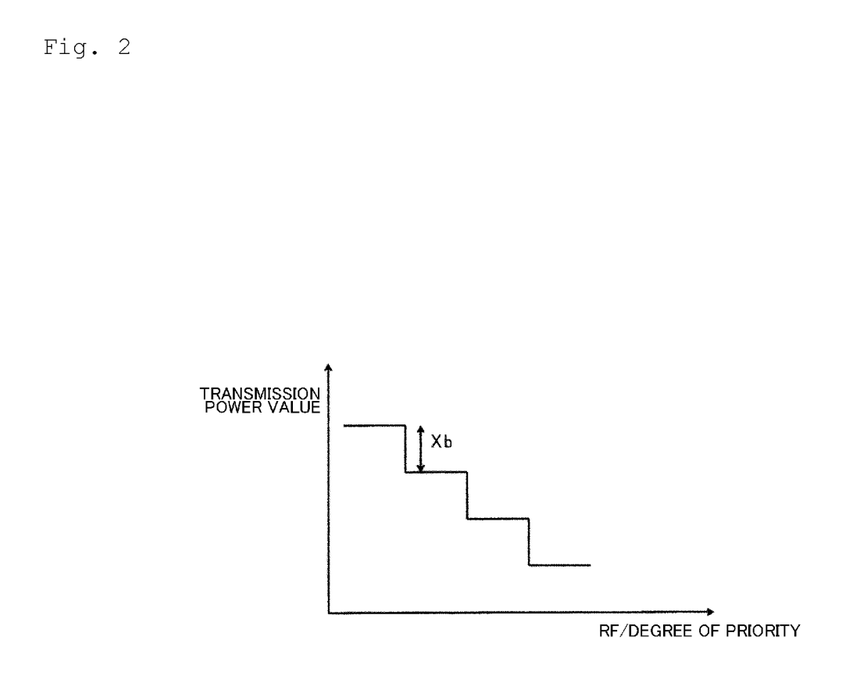
FIG. 2 is a diagram showing a relationship between a degree of priority of an RF and a transmission power value.

The operation parameter information is a transmission power value of a beacon signal in each RF installed in each AP. In the case of an RF of the lowest priority, the transmission power value of a beacon signal is set to a maximum value (reference Tx level) so that the RF can cover a wide area and accommodate every wireless terminal. As the degree of priority of a corresponding RF becomes the next higher rank, the transmission power value of a beacon signal is set to a transmission power value that is obtained by reducing the reference Tx level by Xb (reference Tx level=reference Tx level−Xb). The relationship between the degree of priority of an RF and the transmission power value is shown in FIG. 2.

The transmission power value of a beacon signal defines a communication area of a corresponding RF. As a result of the transmission power value being reduced as the degree of priority of the RF becomes higher, the communication area becomes narrower, and the RF communicates with nearby wireless terminals. For example, as shown by states before and after control in FIG. 3, communication areas of RFs that support 11ac and have high degrees of priority are narrowed by reducing the transmission power value in order to avoid far wireless terminals and only communicate with nearby wireless terminals so that high-speed communication can be performed. As a result, high-speed communication can be performed with nearby wireless terminals that support 11ac. On the other hand, high-speed communication is difficult for a far wireless terminal that supports 11ac, and therefore, even if the wireless terminal is connected to an RF of an AP that supports 11n, an equivalent throughput can be achieved.

Figure 3:
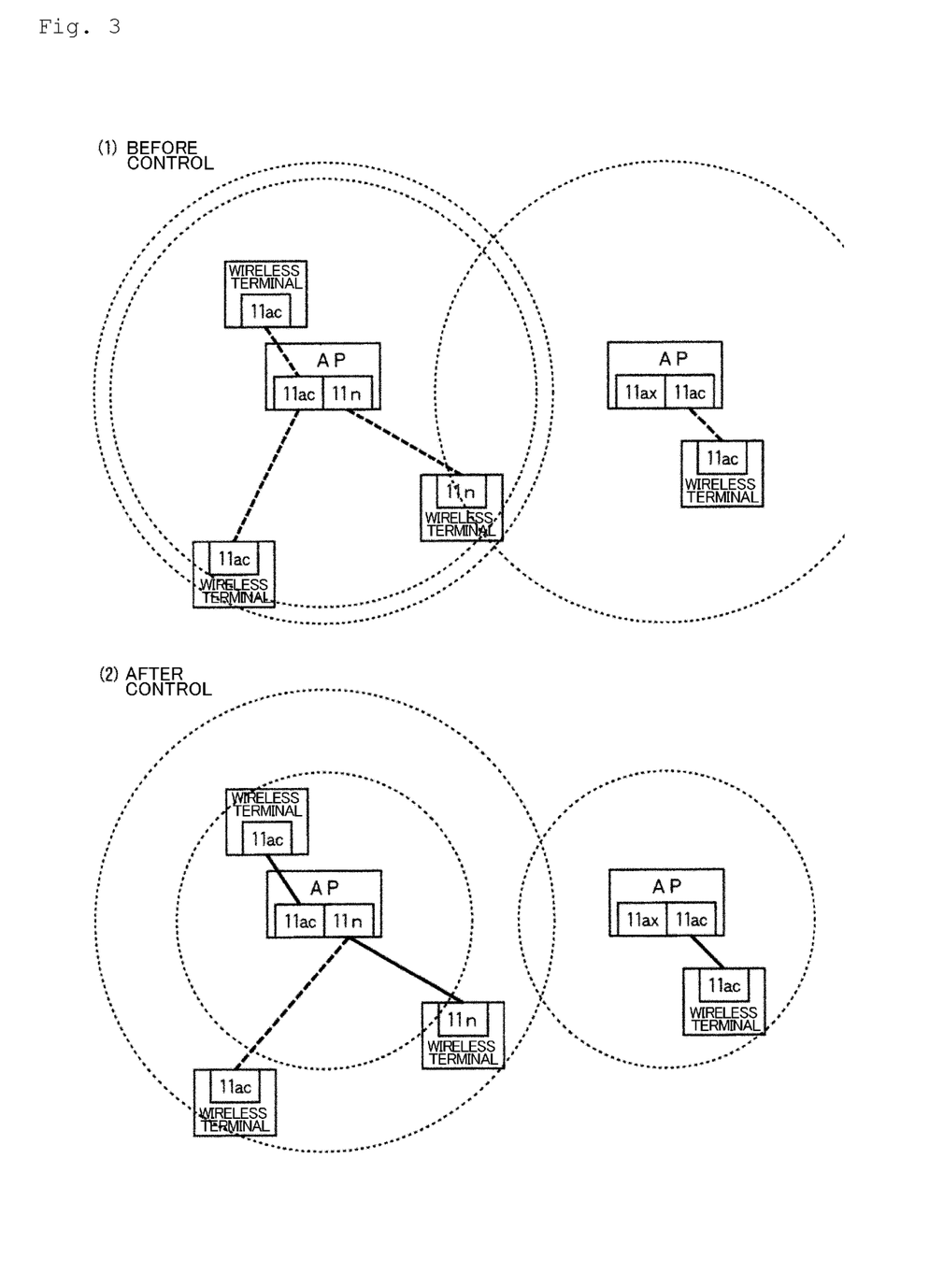
FIG. 3 is a diagram showing states before and after control of transmission power values according to the present invention.

However, the value of Xb that determines how much the transmission power value is reduced from its maximum value is appropriately adjusted according to information regarding a surrounding wireless environment. That is, the value of Xb is determined according to one of or a combination of two or more of RSSI values of connected terminals, the number of connected terminals, (upstream/downstream) data volumes of connected terminals, MCS of connected terminals, and interference conditions in a surrounding region, which are information regarding a surrounding wireless environment of each RF of the AP. For example, if the number of connected terminals has reached a limit, the control device 20 increases Xb to narrow the communication area. Also, if interference in the surrounding region of the AP is low, the control device 20 reduces Xb to enlarge the communication area, and if interference in the surrounding region is high, the control device 20 increases Xb to narrow the communication area.

Figure 4:
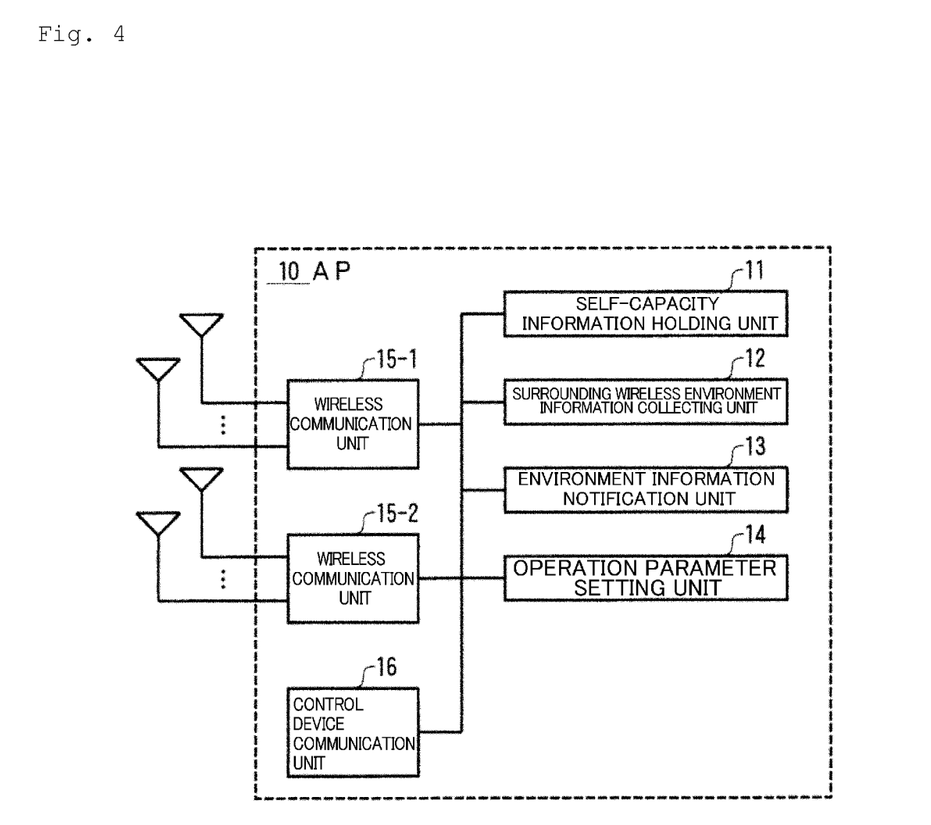
FIG. 4 is a diagram showing an example configuration of a wireless base station (AP) 10.

FIG. 4 shows an example configuration of a wireless base station (AP) 10. In FIG. 4, the AP 10 is constituted by a self-capacity information holding unit 11, a surrounding wireless environment information collecting unit 12, an environment information notification unit 13, an operation parameter setting unit 14, wireless communication units 15-1 and 15-2 including RFs respectively, and a control device communication unit 16. The self-capacity information holding unit 11 holds capacity information regarding each RF that is installed. The surrounding wireless environment information collecting unit 12 collects information regarding a surrounding wireless environment. The environment information notification unit 13 notifies the control device 20 of environment information that includes the capacity information described above and the information regarding the surrounding wireless environment described above. The operation parameter setting unit 14 sets operation parameters (transmission power values) of respective RFs based on operation parameter information that is given from the control device 20. The control device communication unit 16 performs wired or wireless communication with the control device 20.

Figure 5:
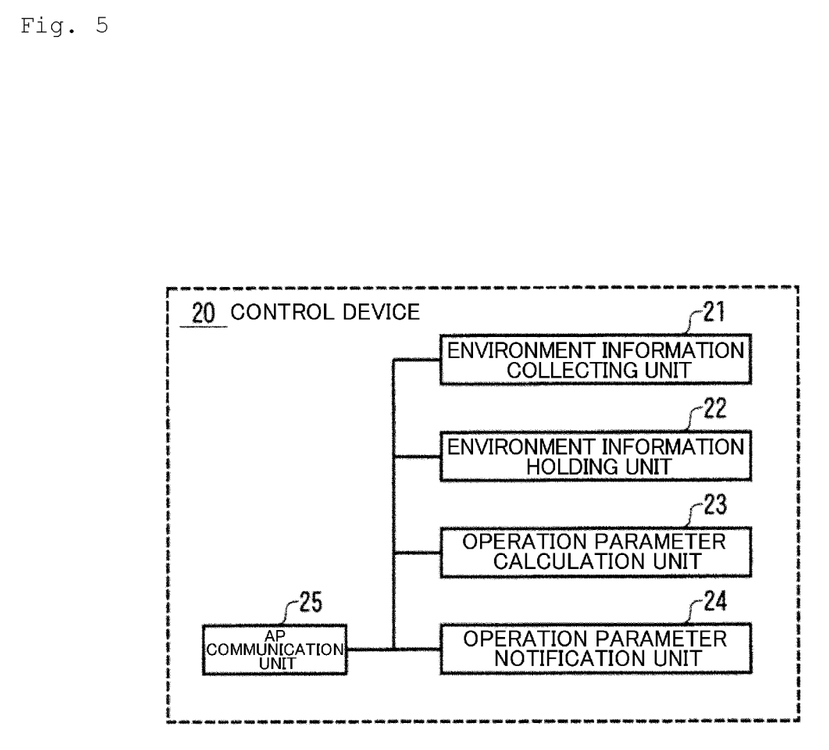
FIG. 5 is a diagram showing an example configuration of a control device 20.

FIG. 5 shows an example configuration of the control device 20. In FIG. 5, the control device 20 is constituted by an environment information collecting unit 21, an environment information holding unit 22, an operation parameter calculation unit 23, an operation parameter notification unit 24, and an AP communication unit 25. The environment information collecting unit 21 collects environment information that is given from each AP 10. The environment information holding unit 22 holds the collected environment information. The operation parameter calculation unit 23 determines an operation parameter (a transmission power value) of each RF installed in each AP 10 based on the collected and held environment information. The operation parameter notification unit 24 gives a notification of the determined operation parameter (transmission power value). The AP communication unit 25 performs wired or wireless communication with each AP 10.

Figure 6:
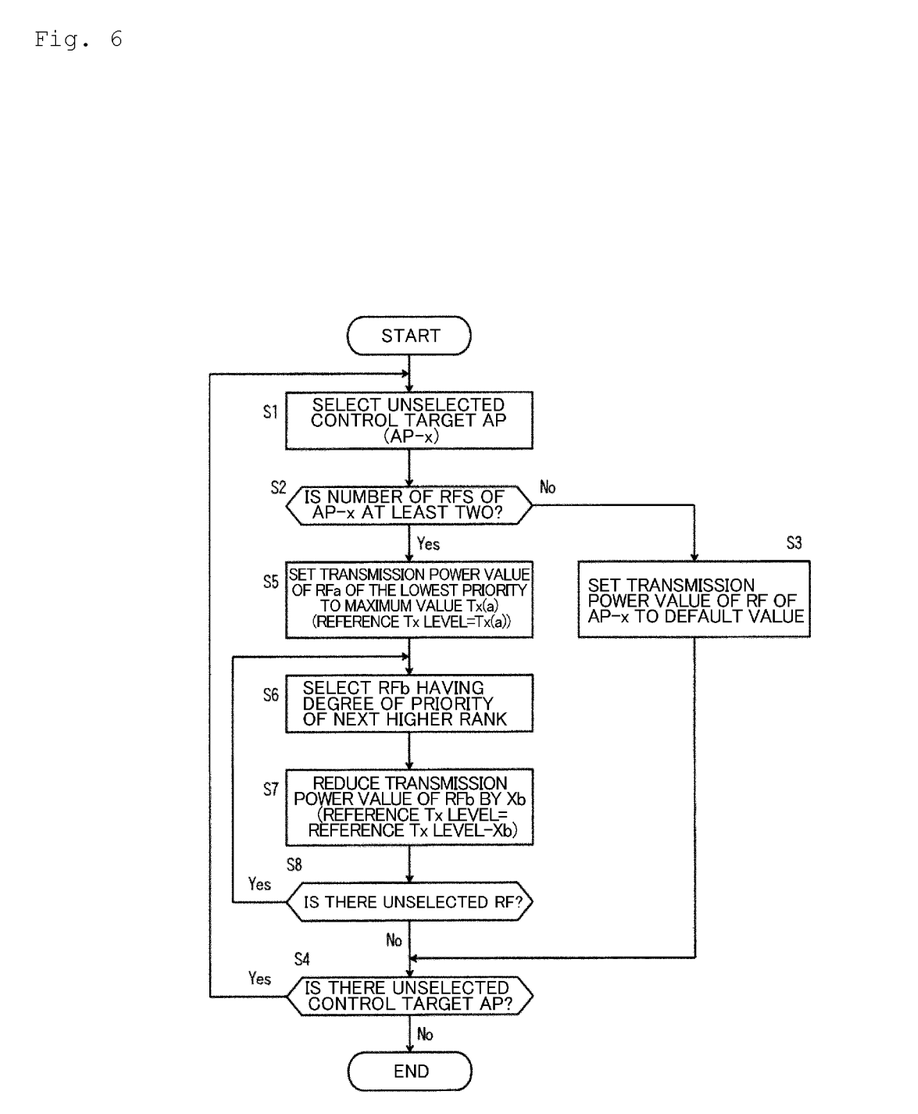
FIG. 6 is a flowchart showing an operation flow of the control device 20 in the present invention.

FIG. 6 shows an operation flow of the control device 20 in the present invention. Note that the operation flow is executed by the operation parameter calculation unit 23 of the control device 20.

In FIG. 6, when the operation flow is started, an unselected control target AP (AP-x) that has not been controlled in the operation flow is selected from control target APs (step S1). Then, whether or not the number of RFs that are installed in the selected AP-x is at least two is checked (step S2). If the number of installed RFs is smaller than two, the transmission power value of an RF of the AP-x is set to a default value (step S3), and the operation flow is executed with respect to another unselected AP-x (steps S4 and S1). On the other hand, if two or more RFs are installed in the AP-x, transmission power values are set for the RFs in ascending order of degrees of priory.

Here, with respect to an RFa (which supports any of 11a to 11n, for example) of the lowest priority, the transmission power value of a beacon signal is set to a maximum value Tx (a) (reference Tx level=Tx(a)) to ensure area coverage (step S5). Next, an RFb that has a degree of priority of the next higher rank is selected (step S6), and the transmission power value of the RFb is reduced by Xb from the reference Tx level (reference Tx level=reference Tx level−Xb) (step S7). This operation is executed with respect to all RFs that are installed in the AP-x in the order of degrees of priority (step S8). With respect to an RF of the highest priority, the transmission power value is set to the minimum to prioritize high-speed communication. As a result, the RF (which supports 11ax, for example) of the highest priority avoids connection with far wireless terminals that have small RSSI values and are not suitable for high-speed communication, and only communicates with nearby wireless terminals.

REFERENCE SIGNS LIST

10 Wireless base station (AP)
11 Self-capacity information holding unit
12 Surrounding wireless environment information collecting unit
13 Environment information notification unit
14 Operation parameter setting unit
15 Wireless communication unit
16 Control device communication unit
20 Control device
21 Environment information collecting unit
22 Environment information holding unit
23 Operation parameter calculation unit
24 Operation parameter notification unit
25 AP communication unit

The invention claimed is:

1. A wireless communication system in which wireless stations are configured to perform transmission and a plurality of wireless modules are configured to be operated in a shared frequency band and are installed in the wireless stations,
   wherein each of the wireless stations is configured to notify a control device of environment information that includes capacity information regarding the wireless station and information regarding a surrounding wireless environment, and to set transmission power values in the plurality of wireless modules, the wireless stations being configured to be notified of the transmission power values by the control device, and
   the control device is configured to calculate a transmission power value of each wireless module of each wireless station based on the environment information collected from each wireless station, following a control guideline that is determined in advance, and to notify the wireless stations of the transmission power values.

2. The wireless communication system according to claim 1,
   wherein, according to the control guideline, degrees of priority are set according to capacity information regarding the plurality of wireless modules or content of a service that is provided, the transmission power value of a wireless module of the lowest priority out of the plurality of wireless modules is set to a maximum value, and the transmission power value is sequentially set to become smaller as the degree of priority becomes higher.

3. The wireless communication system according to claim 2,
   wherein, according to the control guideline, an amount by which the transmission power value is reduced to correspond to the degree of priority is adjusted according to the information regarding a surrounding wireless environment.

4. The wireless communication system according to claim 1,
   wherein the information regarding a surrounding wireless environment is constituted by one of or a combination of two or more of RSSI values of connected terminals, the number of connected terminals, (upstream/downstream) data volumes of connected terminals, MCS of connected terminals, and interference conditions in a surrounding region.

5. A wireless communication method in which wireless stations perform transmission, a plurality of wireless modules that are operated in a shared frequency band being installed in the wireless stations, the wireless communication method comprising:
   each of the wireless stations notifying a control device of environment information that includes capacity information regarding the wireless station and information regarding a surrounding wireless environment, and setting transmission power values in the plurality of wireless modules, the wireless stations being notified of the transmission power values by the control device, and the control device calculating a transmission power value of each wireless module of each wireless station based on the environment information collected from each wireless station, following a control guideline that is determined in advance, and notifying the wireless stations of the transmission power values.

6. The wireless communication method according to claim 5
wherein, according to the control guideline, degrees of priority are set according to capacity information regarding the plurality of wireless modules or content of a service that is provided, the transmission power value of a wireless module of the lowest priority out of the plurality of wireless modules is set to a maximum value, and the transmission power value is sequentially set to become smaller as the degree of priority becomes higher.

7. The wireless communication method according to claim 6,
wherein, according to the control guideline, an amount by which the transmission power value is reduced to correspond to the degree of priority is adjusted according to the information regarding a surrounding wireless environment.

8. The wireless communication method according to claim 5,
wherein the information regarding a surrounding wireless environment is constituted by one of or a combination of two or more of RSSI values of connected terminals, the number of connected terminals, (upstream/downstream) data volumes of connected terminals, MCS of connected terminals, and interference conditions in a surrounding region.

9. A wireless station device in which a plurality of wireless modules that are operated in a shared frequency band are installed, the wireless station device comprising:
means for notifying a control device of environment information that includes capacity information regarding the wireless station device and information regarding a surrounding wireless environment; and
means for inputting and setting transmission power values of the plurality of wireless modules that are calculated by the control device based on the environment information collected from each wireless station device, following a control guideline that is determined in advance.

10. The wireless station device according to claim 9,
wherein, according to the control guideline, degrees of priority are set according to capacity information regarding the plurality of wireless modules or content of a service that is provided, the transmission power value of a wireless module of the lowest priority out of the plurality of wireless modules is set to a maximum value, and the transmission power value is sequentially set to become smaller as the degree of priority becomes higher.

11. The wireless station device according to claim 10,
wherein, according to the control guideline, an amount by which the transmission power value is reduced to correspond to the degree of priority is adjusted according to the information regarding a surrounding wireless environment.

12. The wireless station device according to claim 9,
wherein the information regarding a surrounding wireless environment is constituted by one of or a combination of two or more of RSSI values of connected terminals, the number of connected terminals, (upstream/downstream) data volumes of connected terminals, MCS of connected terminals, and interference conditions in a surrounding region.

* * * * *